United States Patent Office 3,405,211
Patented Oct. 8, 1968

3,405,211
METHOD FOR PRODUCING QUALITY YARN FROM GEL-CONTAINING POLYAMIDE
Leopoldo V. Cancio, Chattanooga, Tenn., assignor to E. I. du Pont de Nemours and Company, Wilmington, Del., a corporation of Delaware
No Drawing. Filed Mar. 16, 1964, Ser. No. 352,298
3 Claims. (Cl. 264—210)

ABSTRACT OF THE DISCLOSURE

A process for producing improved quality yarn from gel-containing polyamides by adding about 0.5 to about 10.0 percent (by weight of polyamide) of a poly(alkylene ether) of a molecular weight of about 1000 to 50,000 to a linear fiber-forming gel susceptible polycarbonamide containing a Coulter counter gel level of from 1.0 to 1,000; melt-spinning filaments of the composition and thereafter drawing the filaments to at least two times their extruded length.

---

This invention relates to a process for production of polyamide fibers. More specifically, it relates to a process for the preparation of fibers from gel-susceptible polyamide, whereby yarn of improved quality and freedom from breaks is obtained.

State of the art

Polyamide fibers are conventionally melt spun and drawn to develop maximum tensile properties. Typical polyamides are those from polycaprolactam and from polyhexamethylene adipamide.

It is well known that polyhexamethylene adipamide has a tendency to form gel at temperatures characteristic of the polymerization and melt-spinning process. This material is produced by thermal degradation of the polyamide by reactions which are not thoroughly understood. It is believed that the thermal degradation produces a decomposition product which serves to form cross-links between end groups on adjacent polymer chains. The decomposition reaction proceeds slowly with time, finally building up a three-dimensional network of molecules which eventually reaches the stage where it is both insoluble in common polyamide solvents and infusible. This material tends to accumulate on heated metal surfaces which are in contact with molten polymer. The accumulation is especially serious where the layer of polymer in contact with the surface is stagnant.

Many expedients have been devised to minimize gel accumulation in autoclaves, polymer transfer lines and spinning equipment. None of these schemes prevents the gel from forming; it is merely kept from accumulating rapidly in the equipment. All the gel which is chemically produced, and does not adhere to the equipment must appear in the spun filaments.

Although gel in the early stages of reaction may not have a definitely adverse effect on yarn quality, it is known that particles in the more highly crosslinked stage are the cause of yarn breakage in drawing, since they can be identified at the break location. The gel particles contribute to another yarn defect, in that they may appear as nubs, which are short sections of filaments of large diameter. These sections are undrawn, and produce deep-dyeing specks in the yarn; when due to gel, the gel particles can be identified in the nub. The concentration of nubs is customarily determined by pulling the yarn through an appropriately-sized yarn cleaner, the presence of nubs causing the yarn to break.

When a polymerization and/or spinning unit has been in operation for a long time e.g., a period of weeks, some gel accumulation occurs. Particles of this gel are sloughed off and appear in the yarn, the amount of frequency increasing with the operating time since the last cleanup. As a result, there is an increase in the number of broken filaments and yarn breaks on drawing. The drawn yarn shows an increase in nubs due to gel.

Another manifestation of the presence of unduly high concentrations of gel in adipamide polymer is the rate at which the pressure increases in the sand filter pack, as spinning continues over long periods of time. This is believed to be due to the accumulation of gel in the filtering media. High pack pressures lead to polymer leaks, low pump delivery and bulged spinnerets. Pack changes provide but temporary relief.

Objects

It is an object of this invention to provide a process for spinning and drawing a gel-containing polyamide yarn whereby yarn of improved quality and freedom of breaks is obtained. It it yet another object of this invention to provide a process for spinning gel-containing nylon yarn whereby the rate of pack pressure increase is minimized.

The invention

These and other objects are attained by adding from about 0.5 to about 10.0% (on wt. of polyamide) of a poly(alkylene ether) of from 1000 to 50,000 molecular weight to a linear fiber-forming gel susceptible polycarbonamide characterized by recurring amide linkages as an integral part of the polymer chain, containing a Coulter counter gel level of from 1.0 to 1,000; melt-spinning filaments of the said composition, and, thereafter drawing the filaments to at least two times their extruded length.

In the normal processing of polyhexamethylene adipamide yarn, prepared in clean equipment (i.e., substantially free from gel) a certain number of yarn breaks are normally encountered in the drawing operation. The number of breaks encountered will depend on many factors, such as denier/filament of yarn being drawn, draw ratio, drawing temperature, etc. For commercial operation, there should be no more than 0.5 to 1 drawtwist break/lb. of yarn. However, as the gel content of the polymer increases, drawtwist breaks exceed tolerance limits and it is then necessary to tear down the spinning equipment, clean it and reassemble it. The process is even more difficult and expensive when the polymer is made by continuous polymerization route and the entire polymerization unit must be disassembled and cleaned. Addition of the poly(alkylene ether), in accord with this invention permits continued operation with gel-containing polymer at an acceptable level of yarn quality. Conversely, addition of the polyether to gel-containing polymer improves yarn quality compared to yarn spun from the same polymer without the polyether.

The mechanism whereby improved yarn quality is obtained from gel-containing polymer by spinning and drawing in the presence of the poly(alkylene ether) is not clear. It is believed that the melt viscosity of the polymer is changed although examination of the polymer as it emerges from the spinneret suggests that no change has occurred. (The size and shape of the polymer "bulge" as it is extruded from the spinneret hole is ordinarily very responsive to changes in the melt viscosity of the polymer.) It is thought that the addition of the polyether enhances the non-Newtonian nature of the polymer. According to this theory, the apparent melt viscosity of a given molecular weight polyamide is decreased at high shear rates. At low shear rates, the viscosity of the polyamide containing the polyether appears to be increased. This theory is supported by several phenomena which have been observed when such compositions are spun. For example, addition of the polyether apparently permits the production of spun yarn having lower birefringence, under otherwise constant conditions. When spinning modified cross-section filaments from the polyamide containing the polyether, filaments are obtained which have a higher modification ratio (modification ratio is defined in U.S. Patent No. 2,939,201) than would be predicted from the polyamide relative viscosity. In addition, filaments of this composition draw with reduced drawing tension as compared to filaments which do not contain the polyether.

Poly(alkylene ether)

The poly(alkylene ethers) which may be incorporated in the gel-susceptible polyamide are either ethylene oxide, propylene oxide or ethylene oxide-propylene oxide condensation products, i.e., the products contain from two to three carbon atoms in the alkylene group with two of the carbon atoms being intralinear carbon atoms connecting intralinear ether-oxygen atoms. Preferably, the poly(alkylene ether) is an ethylene oxide polymer. The poly(alkylene ether) may be a glycol ether, and thus terminated or "capped" by hydroxyl groups, or it may be an oxyalkylated ether of a monohydric or polyhydric alcohol. Suitable alcohols are methanol, ethanol, i-octanol, decanol, laurol, tridecanol, glycerol, pentaerythritol, sorbitol, mannitol, their partial esters and the like. Alternatively, the poly(alkylene) ether may be an oxyalkylated condensation product of a phenol. The preferred poly (alkylene ethers) are those which are substantially linear, and are terminated by hydroxyl groups, or more preferably by one or two ether end groups of the formula —OR, where R is an alkyl, aryl, or aralkyl, such as methyl, ethyl, i-octyl, decyl, lauryl, tridecyl, nonylphenyl, dodecylphenyl, phenyl, naphthyl and the like. Residues of coupling compounds or chain-initiating agents, such as a bisphenol, may be present. It is essential that elements or radicals in the R groups must not be reactive with the polyamide. The necessity for the absence of groups which are reactive with the polyamide will be readily apparent since durability, molecular weight and other physical properties of the polyamide are adversely affected by copolymerization with poly(alkylene ether). The useful molecular weight range for the poly(alkylene ether) is from about 1,000 to about 50,000. The lower limit of molecular weight is established by the volatility of the additive; polyalkylene ethers of too low a molecular weight are vaporized during the spinning process customary for such polyamides. The upper molecular weight limit is established by the melt viscosity of the polyalkylene ether at polyamide spinning temperatures. The melt viscosity of the polyalkylene ether must be substantially less than that of the polyamide, in order to achieve the advantages of this invention. Moreover, it must neither decompose nor volatilize during the melt spinning process to which it is subjected.

Polyamides

The polyamides to which the poly(alkylene ether) is added with beneficial effect on yarn quality are those which form gel at polymerization or melt spinning temperatures. The best known gel-susceptible polyamides are those which are based on adipic acid and diamines of 4 to 10 carbon atoms. Illustrative polyamides are polytetramethylene adipamide, polyhexamethylene adipamide, polydecamethylene adipamide, metaxylylene adipamide and the like. Copolyamides having adipic acid residues are also included.

Other polyamides with a tendency to form gel are those based on sebacic acid, especially useful are those having repeating structural units enumerated in the preceding paragraphs, wherein sebacic acid is substituted, wholly or in part, for adipic acid.

The instant invention is also useful with polyamides which may not be inherently gel-susceptible due to the characteristics of their chemical structure, but do form gel on heating due to the presence of minor amounts of impurities which may be present in the starting material.

Manner of addition

The manner of addition of the polyalkylene ether is not critical, so long as conditions are avoided which induce reaction between the polyether and the polyamide. Thus, the polyether may be added to the autoclave prior to or during polymerization. This is especially satisfactory when the polyether is capped on one or both ends with a non-reactive alkyl or aryl group. Alternatively, the additive may be melt coated on polyamide flake which is then spun on a grid melting unit. Alternatively, polyamide and polyether may be melted on individual screw melters, the melts combined in a mechanical homogenizer and the resulting melt blend spun conventionally.

Gel analysis

It is essential to have a suitable method of analyzing for gel content of the polyamide in order to know when it is beneficial to add the polyether. Although the gel is insoluble in common nylon solvents, e.g., formic acid, it is practically impossible to filter.

A useful analytical tool for this purpose is the Coulter Counter, an instrument manufactured by Coulter Electronics, Chicago, Ill.

The Coulter Counter determines the number and size of particles suspended in an electrically conductive liquid. This is accomplished by forcing the suspension through a small aperture having an immersed electrode on either side. The particle concentration is adjusted so that the particles traverse the aperture substantially one at a time.

Each particle passage displaces electrolyte within the aperture, momentarily changing the resistance between the electrodes and producing a voltage pulse of a magnitude that is proportional to particle volume. The resultant series of pulses are electronically amplified, scaled and counted.

The electrolyte in the aperture forms the principal resistance between the electrodes, and the resistance change due to particle passage is expressed by the following equation:

$$\Delta R = \left(\frac{P_o V}{A^2}\right)\left(\frac{1}{\frac{1}{1-P_o/P} - \frac{a}{XA}}\right)$$

$\Delta R$ = change in resistance
$P_o$ = electrolyte resistivity
$A$ = aperture area normal to axis
$V, P, a$ = particle: volume, effective resistivity and area normal to aperture axis
$X$ = particle dimension ratio $l/d$
$= \dfrac{\text{length parallel to aperture axis}}{\text{diameter of equivalent sphere}}$ This response, $\Delta R$, for a given aperture size and electrolyte, is primarily proportional to particle volume.

Particle shape cannot be determined, but data and results are calculated and expressed as spherical equivalents. The particles are assumed to be spherical because sufficiently high number of particles are counted to assume an averaging of orientations of particles traversing the aperture.

A more detailed description of the equipment is given by R. H. Berg:

"Electronic Size Analysis of Subsieve Particles by Flowing Through a Small Liquid Resistor," A.S.T.M. Special Technical Publication No. 234, pp. 245–255 (1958).

The gel counts reported herein as "Coulter gel count" are determined on a solution containing 5 grams of polyamide in 100 ml. of 90% formic acid. The formic acid also contains 1.0% NaCl, to increase its conductivity. The orifice through which the solution flows during the analysis is 200 microns in diameter, and its resistance is 23,700 ohms. The volume of sample solution actually counted is 2.0 ml. The values reported are the number of thousands of particles greater than 7.3 microns diameter, in 2.0 ml. of solution.

Before use, the instrument is calibrated using a suspension of uniform particles of known size.

Compositions are given in parts or per cent by weight, unless otherwise indicated.

EXAMPLE I

Two batches of polymer, A and B, are prepared by conventional autoclave polymerization, for example as described in the U.S. patent to Spanagel, No. 2,163,636. Batch A is polyhexamethylene adipamide (66), and Batch B is a copolymer of 92 parts hexamethylene adipamide and 8 parts hexamethylene isothalamide (66/6I). To each is added 2.5% of nonylphenoxy capped polyethylene ether alcohol of about 1600 mol. wt. The gel count of each polymer batch is determined. The polyhexamethylene adipamide component A has a very low gel count of 0.4, in the range where its effect is undetectable. The copolymer B has a relatively high gel count of 23. The two polyamides A and B are grid melted in a stream atmosphere, spun through a divided spinneret having Y-shaped holes, the filaments mingled and wound up on a single package. The yarn is then drawn 3.0×; the yarn has a drawn denier of 40, there being 14 filaments of each polyamide. Each filament has a trilobal cross section. The drawn yarn is passed through a cleaner set to a clearance of 0.0035 inch, and the number of breaks per million end-yarns (CB/MEY) is noted.

The test is repeated, omitting addition of the polyalkylene ether to the copolymer B. The observed gel content of copolymer B is 32. The data are reported in Table 1.

TABLE 1

| Polymer Identification | Run No. | | | |
|---|---|---|---|---|
| | 1 | | 2 | |
| | A | B | A | B |
| Polyamide | 66 | 66/6I | 66 | 66/6I |
| Polyether added, percent | 2.5 | 2.5 | 2.5 | 0 |
| Polymer rel. visc. (RV) [1] | 35.9 | 34.3 | 35.9 | 33.7 |
| Gel content [2] | 0.4 | 23 | 0.4 | 32 |
| Modification ratio | 2.06 | 2.09 | 2.00 | 1.97 |
| Cleaner breaks, CB/MEY | 0.49 | | 4.06 | |

[1] Polymer relative viscosity as defined in U.S. 2,385,890.
[2] Gel content is the number of particles (in thousands) of at least 7.3 microns in diameter.

It is noted that the yarn from Run 2 has 8 times as many cleaner breaks as that of Run 1.

In evaluating the effect of the gel count in the two types of filaments A and B, it should be noted that the high gel concentration of B has about the same effect on number of cleaner breaks as if distributed equally between A and B. It is also noted that the modification ratio for the 66 component is significantly higher than that expected from the polymer relative viscosity. With the relative viscosity and spinning conditions employed, a modification ratio of 1.8 would be expected. The high quality of the yarn is especially surprising, since normally mechanical quality deteriorates with increasing modification ratio.

EXAMPLE II

Polyhexamethylene adipamide flake containing 0.5% $TiO_2$ is grid-melted and spun to a yarn (1) having 13 round cross section filaments. The yarn is drawn 3.66× to a final denier of 40. The Coulter gel count of the yarn, the cleaner breaks and the drawtwister breaks per lb. of yarn (DTB/lb.) are listed in Table 2.

To another portion (2) of the polymer used in the previous test, 0.01% gelled polymer is added. To make the addition, the gel is ground to pass through a 40 mesh screen, then added to the flake as a suspension in water. The flake is soaked for about 2 days for adsorption onto the flake to be complete, then it is dried under vacuum at room temperature. Following the previous procedure, yarn is spun and tested; the results are given in the table.

A third batch of yarn (3) is prepared, as described for Run (2); in this case, the finely ground gel is suspended in a 25% aqueous solution of the polyether used in Example 1. Sufficient polyether is added to make a concentration of 2.5% based on weight of nylon. The data are also given in Table 2.

TABLE 2.—EFFECT OF ADDED GEL

| Run number | 1 | 2 | 3 |
|---|---|---|---|
| Gel added, percent | 0 | 0.01 | 0.01 |
| Polyether added, percent | 0 | 0 | 2.5 |
| Coulter count; gel in yarn | 4.8 | 16.4 | 11.3 |
| CB/MEY | 20 | 100 | 65 |
| DTB/lb | 0.4 | 1.05 | 0.45 |

It is noted that the original yarn (1) is of rather poor quality, which is consistent with a rather high level of gel content. Addition of gel in Run 2 increases cleaner breaks drastically. When polyether is added to the gel-containing polymer of Run 2, cleaner and drawtwist breaks are greatly reduced.

EXAMPLE III

Polyhexamethylene adipamide flake of 33 relative viscosity, containing 0.3% $TiO_2$ is melted in a screw type extruder and the melt is spun to a 14 filament yarn of trilobal cross section. After drawing 3.24×, the yarn (1) is 40 denier. Coulter gel count and cleaner breaks are determined and listed in Table 3.

In a second run, a 25% aqueous solution of polyether of the type used in Example 1 is injected into the screw extruder. The polyether content is 0.5%. The yarn (2) is spun, drawn and tested as before (see Table 3).

TABLE 3

| Run number | 1 | 2 |
|---|---|---|
| Percent polyether added | 0 | 0.5 |
| Gel count | 2.1 | 2.8 |
| CB/MEY | 10.2 | 6.8 |

It is noted that an improvement in cleaner break level is observed even at this low polyether concentration.

When the test is repeated, adding 2.5% of the polyether, a larger improvement is observed.

EXAMPLE IV

This example shows the utility of polyether addition in decreasing the rate at which pack pressure increases when the polyamide contains large amounts of gel.

Eight batches of polyhexamethylene adipamide polymer are prepared according to the procedure of Example 2. Various amounts of gel are added; in some cases, 2.5% of the polyether of Example 1 is also added. While the batches are spun to yarn, the rate of pack pressure increases in lbs. per square in. per hour is determined; the results are listed in Table 4.

TABLE 4.—EFFECT ON PACK PRESSURE INCREASE

| Gel added, percent | Polyether added, percent | |
|---|---|---|
| | 0 | 2.5 |
| | Pressure Incr., p.s.i./hr. | Pressure Incr., p.s.i./hr. |
| 0 | 54 | 17 |
| 0.05 | 74 | 34 |
| 0.09 | 95 | 58 |
| 0.13 | 168 | 52 |

It is noted that the polyether is very effective in minimizing the rate of pressure increase.

EXAMPLE V

This example shows that at low gel count levels (e.g., below 1), there is no detectable advantage in adding the polyether.

Parellel tests are carried out in which 36 denier 34 filament 66 nylon, containing 0.3% TiO₂ added in different ways, is prepared to contain no polyether, or to contain 0.5% of the polyether of Example 1. Gel count, cleaner breaks and drawtwist beraks are given in Table 5 for two series of tests.

TABLE 5

| Test Series | 1 | | 2 | |
|---|---|---|---|---|
| Polyether content, percent | 0 | 0.5 | 0 | 0.5 |
| Coulter gel count | 0.4 | 0.1 | 0.3 | 0.3 |
| CB/MEY | 3 | 2 | 16 | 14 |
| DTB/lb | 0.13 | 0.07 | 0.26 | 0.20 |

In this series of tests, it is concluded that the increased level of cleaner and drawtwist breaks in series 2 vs. series 1 is not due to difference in gel content, but is due to other causes—in this case, manner of adding TiO₂.

From the foregoing discussion, description and data it is evident that this invention constitutes a uniquely simple way of minimizing the effect of gel in polyamide yarn. In consequence of this discovery, longer trouble-free operation of a nylon yarn production unit can be had before cleanup is necessary since addition of the poly(alkylene ether) will minimize the effect of gel for an extended period. Moreover it will have a helpful effect on the sand pack-spinneret assembly in that the rate of back pressure buildup is decreased. In addition the quality of yarn produced in accordance with this invention is, compared to that obtained in the absence of the poly(alkylene ether), better since fewer breaks, nubs and the like will result from gel that is present. One particularly advantageous manner of making use of this discovery is to include routinely poly(alkylene ether) in the reaction mix wherein the polyamide is to be produced. Thereupon when gel buildup does occur its effect will be lessened for a significant period of time. Other ways to utilize this discovery will be apparent to those skilled in the art.

While the manner of making suitable nylon yarn is well known in the art, for example in the Spanagel patent cited above, reference can be made to the abandoned copending application of Magat and Sharkey, Ser. No. 326,425, filed Nov. 27, 1963, assigned to the assignee of the present application and especially the examples thereof, for further details.

What is claimed is:

1. A method for producing nylon yarn from a linear, fiber-forming, gel-susceptible polycarbonamide characterized by recurring amide linkages as an integral part of the polymer chain comprising:

(a) admixing with said polyamide when its Coulter Counter gel level reaches 1.0 from about 0.5% to about 10% based on the weight of said polyamide of a poly(alkylene ether) having a molecular weight of about 1,000 to 50,000,
   (b) spinning filaments from the resulting composition, and
   (c) thereafter drawing the said filaments at least two times their spun length.

2. A method in accordance with claim 1 in which the polycarbonamide is polyhexamethylene adipamide.

3. A method in accordance with claim 1 in which the poly(alkylene ether) is formed from a member selected from the group consisting of ethylene oxide, propylene oxide, and mixtures of ethylene oxide and propylene oxide.

References Cited

FOREIGN PATENTS 623,762   4/1963   Belgium.
963,320   7/1964   Great Britain.

DONALD J. ARNOLD, *Primary Examiner.*